May 14, 1929.  L. A. HEINTZELMAN  1,713,044
HANGER
Filed June 8, 1925
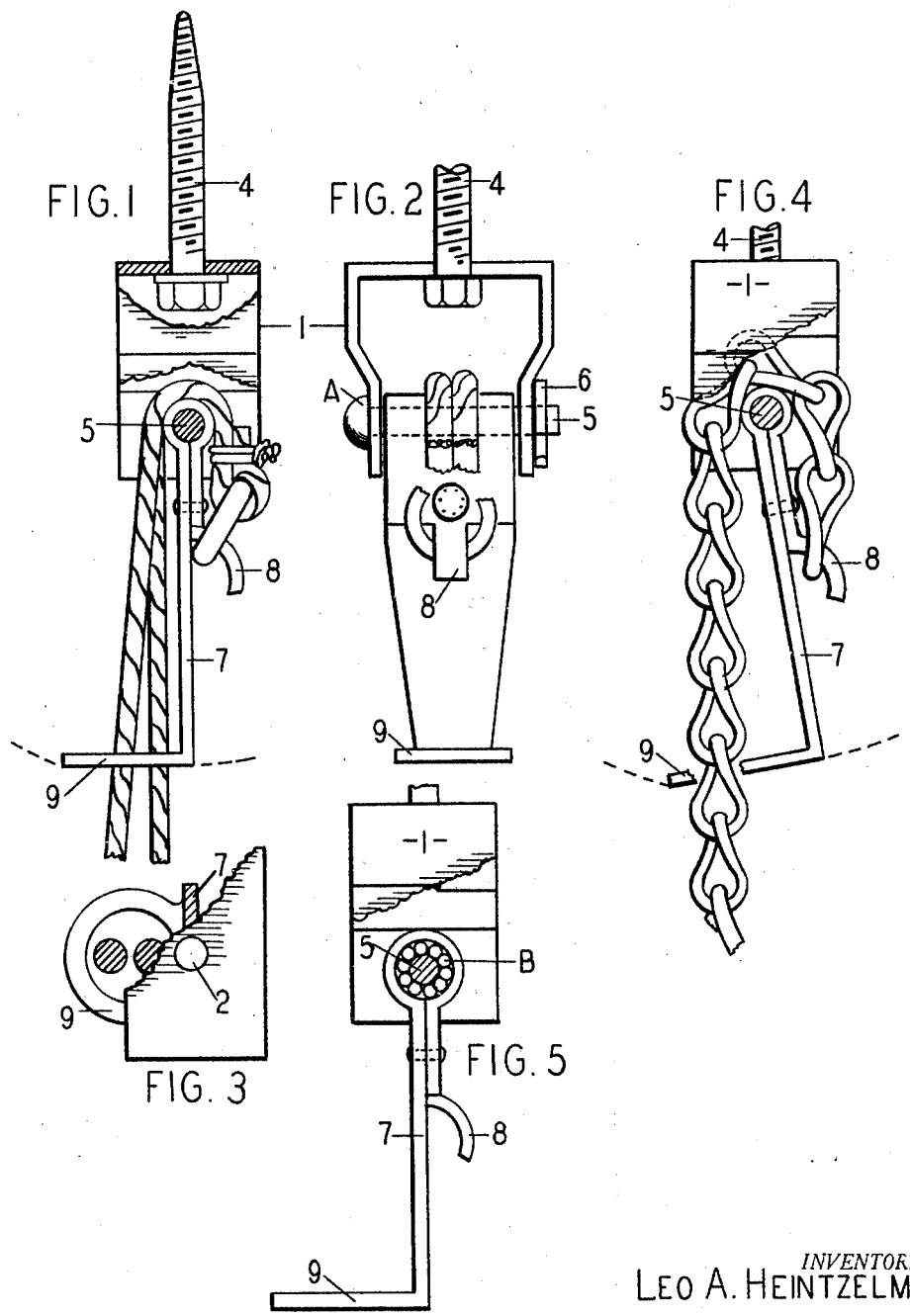
INVENTOR.
LEO A. HEINTZELMAN
BY U. S. Charles.
ATTORNEY.

Patented May 14, 1929.

1,713,044

UNITED STATES PATENT OFFICE.

LEO A. HEINTZELMAN, OF TOPEKA, KANSAS.

HANGER.

Application filed June 8, 1925. Serial No. 35,629.

My invention relates to a hanger, and has for its chief object a mechanism that will sustain a pendently swinging load eliminating the friction being imposed on the cable, chain, or strap at the bearing point of the hanger.

A further object of my invention is to provide a hanger adapted for oscillation.

A still further object of my invention is to provide a hanger having a convenient hook to which the chain or other means for pendency may be attached.

These and other objects will hereinafter be more fully explained, reference being had to the accompanying drawings which form a part of this application in which Fig. 1 is a side elevation of the hanger, parts broken away for convenience of illustration.

Fig. 2 is a transverse view of Fig. 1.

Fig. 3 is a top view, parts removed for convenience of illustration.

Fig. 4 is a side view, showing a chain attached.

Fig. 5 is a side view showing the sleeve with roller bearings.

1 is a clip having an aperture 2, centrally positioned as shown in Fig. 3, 4 is a screw engaging in said aperture by which means the said clip may be fastened to a beam, or the like, 5 is a pin engaging in apertures through the ends of the clip, the said pin having a head A on one end and a cotter pin 6 engaging through an aperture in said pin by which means the pin is held to engagement through the said apertures, and on said pin is revolvably mounted a sleeve having a shank 7 integral therewith, the said shank having a hook 8 to which the load bearing cable or chain may be attached, on the end of said shank, and positioned at right angles thereto is an annular ring 9 through which the load bearing cable or chain will pass and by engagement there through will prevent the said shank from revolving, allowing the chain to detach from the hook 8, but the principal object of the cable engaging through said ring is that the shank will oscillate with the oscillations of the chain eliminating the friction that otherwise would be on the chain where the load is imposed. In Fig. 5 is shown roller bearings B for the sleeve which will eliminate friction and will require less oiling. In the event of a chain being employed to carry the load it can readily be seen how the length may be varied by attaching any of the links to the hook.

My hanger will also eliminate unnecessary friction and wear on a strap of leather or other material, and when such is employed for suspending the load a ring may be attached to the end thereof, for engagement with the hook, or the strap perforated for engagement therewith, and to accommodate for the shape of a strap the annular ring may be changed to a slot through which the strap will pass causing the shank to function for the purpose heretofore described.

In Fig. 2 I have shown a screw engaging through the perforation of the clip, which may be driven into a beam or the like by means of a wrench, and to obviate revolutions of the screw or hanger, a lock washer may be employed as in Fig. 1 at 10, but I do not confine myself to use any particular means for attaching the hanger and other modifications may be employed as lies within the scope of the appended claim. Neither do I set forth any particular purpose for which my hanger may be employed, but I do recommend its use in porch, and other swings as a factor of safety.

Having thus described my invention, what I claim as new and desire to secure by Letters Patent is:—

A hanger of the kind described, comprising a U-shaped clip having a pin connected to the ends or arms thereof and means to attach the clip to a beam or the like, a shank having a portion turned back on itself, whereby an eye is formed to engage on the pin, a hook member integrally connected to the return end portion of the shank, the opposite end of the shank having a right angle bend the outer portion of which is perforated through which a chain or cord will engage when attached to the hook and looped over the eye, whereby the shank is rocked to a fixed position to avoid frictional engagement between the chain or cord and its load bearing point.

LEO A. HEINTZELMAN.